May 5, 1959 J. W. PAULY 2,884,903
CUSHIONED PISTON ASSEMBLAGE FOR CYLINDERS
Filed Sept. 13, 1957
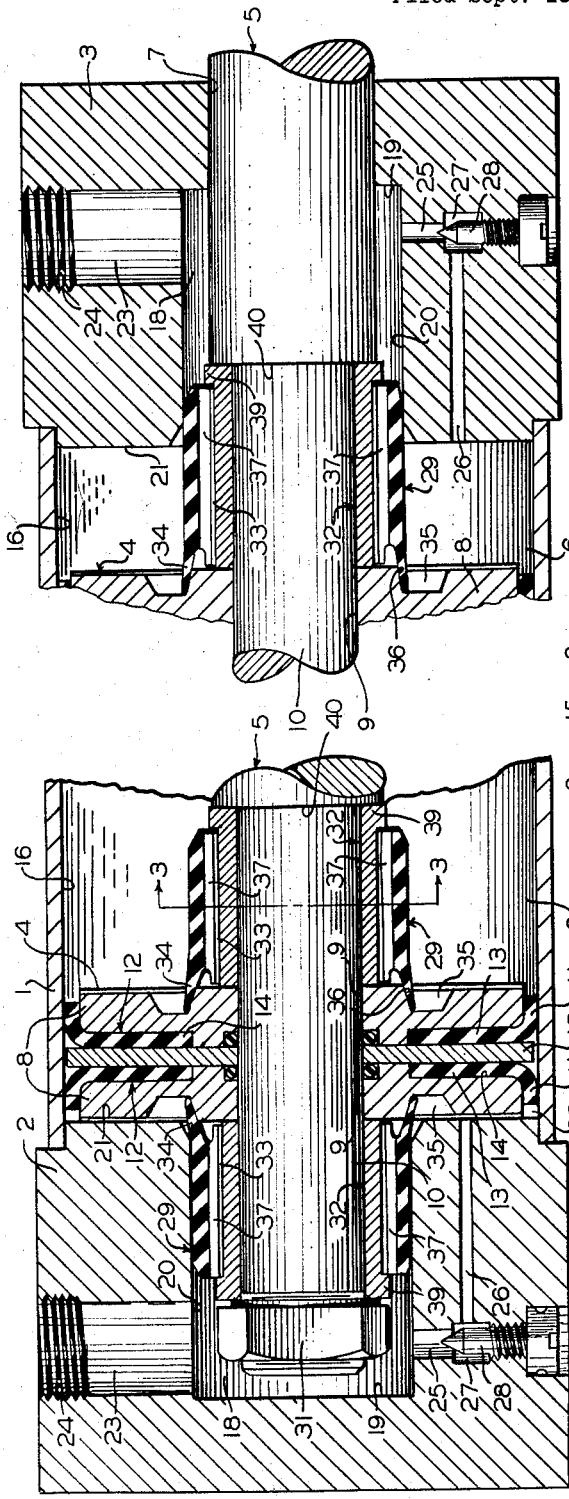
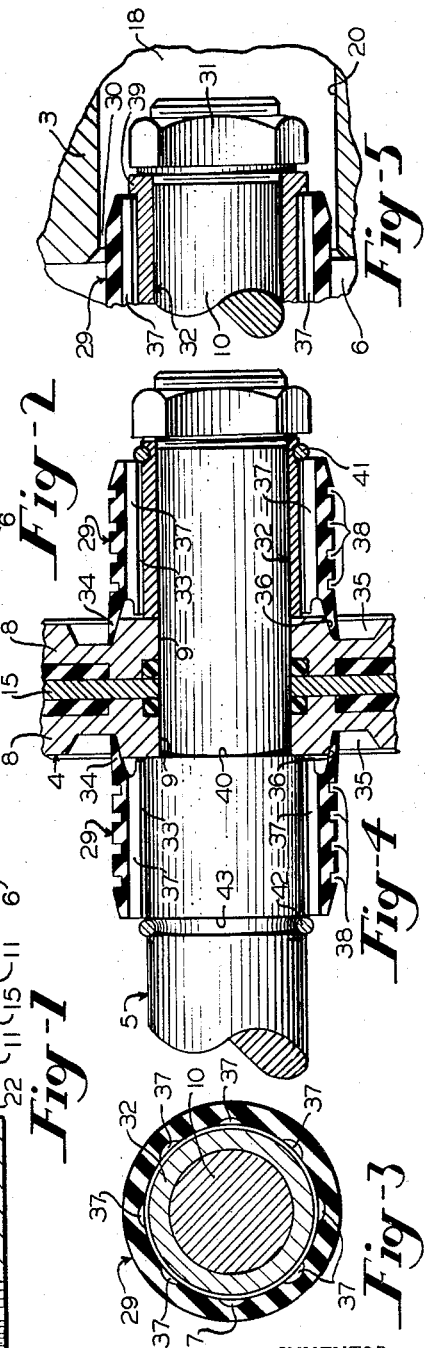
INVENTOR.
Joachim W. Pauly
BY
Adelbert A. Steinmiller
Attorney

United States Patent Office 2,884,903
Patented May 5, 1959

2,884,903

CUSHIONED PISTON ASSEMBLAGE FOR CYLINDERS

Joachim W. Pauly, San Leandro, Calif., assignor to Westinghouse Air Brake Company, Wilmerding, Pa., a corporation of Pennsylvania Application September 13, 1957, Serial No. 683,871

11 Claims. (Cl. 121—38)

This invention relates to fluid pressure cushioned piston cylinder devices, and more particularly to the means incorporated in such devices whereby the piston cushioning is attained.

Various types of cushioning arrangements for piston assemblages are known involving a packing cup or sealing ring on a coaxial projection at one side (or both sides) of a piston which by coaction with the wall of the bore in the cylinder head serves to restrict flow of fluid trapped between the piston and cylinder head in one direction of travel of the piston and which acts as a valve element to enable fluid supplied to the bore in the cylinder head to flow rapidly to the face of the piston for effecting rapid return movement of the piston away from the cylinder head.

The present invention concerns a piston assemblage employing a simple sleeve element of resilient material, such as rubber, on the coaxial projection thereof which provides in a simple manner for close conformity to the bore in the cylinder head for piston cushioning purposes and which has a plurality of internal circumferentially spaced longtudinally extending passages therethrough which enables rapid flow of fluid under pressure to the face of the piston for the return stroke of the piston, the innermost end of the sleeve element being formed and located so as to coaxially surround and cooperate with an annular valve seat formed on the adjacent face of the piston to act as a check valve to prevent exit flow therepast of fluid trapped in the cylinder between the piston and the head approached by the piston, while unseating to permit rapid reverse flow of fluid under pressure, supplied through said longitudinal passages, to the face of the piston.

The present invention further concerns several different embodiments for assembling a piston assembly of the type employing the sleeve element previously mentioned.

The prime object of the present invention is the provision of a cushioned piston assemblage of the above type.

Other objects and advantages will become apparent from the following description of the invention.

In the accompanying drawing, Figs. 1 and 2 are longitudinal sectional views illustrating two different operational positions of a portion of a fluid pressure cylinder device embodying one form of the invention;

Fig. 3 is a sectional view taken along the line 3—3 in Fig. 1 illustrating a portion of a piston assemblage comprised in the structure shown in Fig. 1;

Fig. 4 is a fragmental view of a piston assemblage embodying an alternate form of the invention; and Fig. 5 is a fragmental view of an alternate arrangement for restricting escape of fluid under pressure ahead of the piston assemblage such as is illustrated in Figs. 1, 2 or 4 during cushioning of its movement.

Description

Referring to Figs. 1 and 2 in the drawing, for sake of illustration, the cylinder device embodying the invention may comprise a hollow cylinder body 1 closed at opposite ends by pressure heads 2 and 3, respectively, and containing a reciprocable piston assemblage 4 in slidable fluid pressure sealed engagement with the inner wall of said cylinder. Movably attached to the piston assemblage 4 is the usual piston rod 5 which, in extending through such as a pressure chamber 6 and a central opening 7 in the pressure head 3 at the one end of the cylinder body 1, may serve the usual function of providing for the connection of the piston assemblage 4 with means to be actuated, as well as serving as the medium by which movement of the piston assemblage may be guided to prevent its cocking during reciprocable movement within said cylinder.

Insofar as the piston assemblage acts as a means for translating a fluid pressure force into a mechanical force applied to the piston rod 5, or vice versa, and aside from the novel aspects of the invention, such assemblage may take the form in which it is shown in the drawing as comprising a pair of spaced-apart annular piston elements 8, each of which is provided with a central bore 9 to accommodate disposition of a reduced portion 10 of the piston rod 5 which extends therethrough in close fit with the walls thereof. The outer diameter of the piston elements 8 is less than the internal diameter of the hollow cylinder body 1 to provide sufficient annular clearance in encirclement of said piston elements to accommodate the skirt portions 11 of the usual pair of oppositely-facing packing cups 12 which are provided to prevent leakage of fluid under pressure within the cylinder body 1 past the piston assemblage. Each of the packing cups 12 is provided with the usual radial flange 13 extending inwardly from its respective skirt portion 11 and which is disposed in an annular groove 14 formed in one face of the respective piston element 8 and is clamped between such element and an intermediate back-up element 15 mounted on the reduced portion 10 of the piston rod 5. In accord with the usual practice, the outer diameter of the intermediate back-up element 15 may be only slightly less than the inner diameter of the hollow cylinder body 1 so that such element 15 may slidably engage the cylinder wall 16 of said cylinder body 1 to slidably guide the piston assemblage during movement within the cylinder under circumstances should the packing cups 12 fail to act in this regard.

The pressure heads 2 and 3 may be secured to the cylinder by any suitable means (not shown) and sealing means (not shown) may be provided to afford a static seal between the pressure heads and the cylinder body 1 to prevent leakage of fluid under pressure therebetween to the exterior of the device.

According to structural features of the invention, each of the pressure heads 2 and 3 is provided with a central cavity 18 defined by end wall 19 and a cylindrical surface 20 extending from said wall into intersection with an innermost face 21 of the respective pressure head 2, 3. The cylindrical cavity 18 is arranged to be coaxial with the hollow cylinder body 1 and open centrally into the pressure chamber 6, in the case of the pressure head 3, and to a pressure chamber 22 at the respective side of the piston assemblage 4, in the case of the pressure head 2.

Adjacent to the end wall 19, each cylindrical cavity 18 is in constantly open communication with a fluid pressure supply and release port 23 extending radially outward therefrom to the exterior of the respective pressure heads 2, 3. Each supply and release port 23 is adapted, by means of such as screw threads 24, to be connected to external conduit means for conveying fluid under pressure thereto and therefrom. This same end of each cylindrical cavity 18 is also constantly open to the respective pressure chamber 6, 22 by way of a radial passage 25, and a longitudinal passage 26 opening into the annular face 21 of the respective pressure head 2, 3. In the preferred embodiment shown in the Figs. 1 and 2, communication between the passages 25 and 26 occurs by way of a needle valve chamber 27 which accommodates a needle valve 28, adjustable from the exterior of the respective cylinder head 2, 3 for regulating the degree of restriction to flow of fluid under pressure imposed by such communication.

According to a principal structural feature of the invention, removably secured to each side of the piston assemblage 4 is a sleeve element 29 of resilient material which projects centrally from the piston assemblage 4 in the direction of the respective pressure head 2, 3 in substantially coaxial alignment with respective cylindrical cavity 18 therein. In the preferred embodiment of the invention shown in Figs. 1 and 2, the outer diameter of the sleeve element 29 is only slightly less than or substantially equal to the inner diameter of the cylindrical surface 20 of the cavity 18 of the respective pressure head 2, 3 for slidable sealing engagement therewith. The end of such sleeve element is reduced in diameter, or tapered, to permit easy entrance thereof into said cavity during stroke completing travel of the piston assemblage 4 in the direction of the respective pressure head 2, 3, even during the existence of a moderate degree of radial misalignment between the axis of the piston assemblage and the axis of said cavity.

In the alternate arrangement shown in Fig. 5, the outer diameter of the sleeve element 29 is less than the diameter of the cylindrical surface 20 to provide an annular fluid pressure clearance passage 30 therebetween while said sleeve element is disposed in said cavity for restricted escape of fluid under pressure ahead of the piston during its stroke completing movement. In the latter case, passages 25 and 26 together with the needle valve 28 of Figs. 1 and 2 are unnecessary and may be eliminated from the pressure head shown in Fig. 5.

The length of the sleeve element 29 relative to the length of the cavity 18 is such that when said sleeve element is fully inserted therein same will not interfere with communication between said cavity and either the port 23 or the passage 25, as the case may be and as is apparent in Fig. 1.

In the instance shown in Fig. 1, the length of the sleeve element 29 relative to the length of the cavity 18 is also such as will provide sufficient clearance from the end wall 19 to accommodate projection of a threaded end of the reduced portion 10 of the piston rod 5 and disposition of a nut 31 in screw-threaded attachment with said threaded portion.

According to additional structural features of the invention, in each embodiment shown on the several figures, the resilient sleeve element 29 is hollow to adapt same to either fit around a rigid sleeve element 32 mounted on reduced portion 10 of the piston rod 5 as shown in Figs. 1, 2, 3, 4 and 5, or to fit directly onto said piston rod as in the case of the one resilient sleeve element 29 shown in Fig. 4. The interior diameter of the resilient sleeve element 29 is slightly larger than the outer diameter of either the rigid sleeve element 32 in the one case and the piston rod 5 in the other case, to provide a clearance 33 therebetween to afford sufficient freedom for radial movement relative to the axis of the piston rod to thus enable said resilient sleeve element 29 to align itself with respect to the cylindrical surface 20 of the cavity 18 during insertion therein and existence of slight misalignment between these parts.

The resilient sleeve element 29 comprises a valve portion 34 at its one end in the form of a skirt which projects into an annular cavity 35 formed in a face of the respective piston element 8. The resilient characteristics of the valve portion 34 in its natural state preferably are such that inherently it will obtain sealing contact with an annular seat 36 formed in the piston element 8 at the radially innermost end of the recess 35. The annular seat 36 is preferably tapered or of generally conical shape to facilitate fitting the skirt-like valve portion 34 of element 29 thereover during assemblage of the piston structure.

The resilient sleeve element 29 is further provided with a plurality of circumferentially-spaced-apart flow passages 37 which extend longitudinally from one end thereof into the interior of the valve portion 34.

In the embodiment shown in Fig. 4, the sealing valve element 29 further may be provided with a plurality of axially spaced-apart annular grooves 38 which may be filled with a suitable lubricant for distribution of same on the cylindrical surface of a respective cavity 18 to lubricate said sealing valve element during insertion into such cavity 18 in the case where the outer surface of such resilient sleeve element slidably engages such cylindrical surface, as in the embodiment shown in Figs. 1, 2 and 4, for example.

According to additional structural features of the invention, several arrangements may be employed for securing the piston assemblage 4 and resilient sleeve element 29 in place. For example, referring to Figs 1 and 2, each of two resilient sleeve elements 29 at opposite sides of a piston assemblage 4 may be mounted on respective rigid sleeve elements 32 and retained in place thereon by respective annular flanges 39 formed integrally with such rigid sleeve elements and extending radially outward therefrom at their ends furthermost from said piston assemblage. The outer diameter of such flanges 39 are preferably such that said flange will not cover the outermost open ends of the flow passages 37 in a respective resilient sleeve element 29 to any matereial extent.

The rigid sleeve elements 32 together with the piston elements 8 and back-up element 15 of piston assemblage 4 in turn may be held together in position on the reduced portion 10 of the piston rod 5 by a clamping action between the removable nut 31 and an annular shoulder 40 formed at the intersection of such reduced portion 10 with the remainder of said piston rod 5.

An alternate arrangement as shown in Fig. 4 provides for securing one of the resilient sleeve elements 29 onto a respective rigid sleeve 32 encircling a reduced portion 10 of the piston rod 5 by a lock ring 41 and for retaining such assemblage in place on such reduced portion together with previously-identified components of the piston assemblage 4 by clamping action between the nut 31 and the shoulder 40, which in the present instance will be relocated with respect to the corresponding shoulder shown in Figs. 1 and 2. The other of the two resilient sleeve elements 29 of Fig. 4 may be mounted directly on the unreduced portion of the piston rod 5 and held in place by a lock ring 42, corresponding to lock ring 41, disposed in an annular groove 43 in the piston rod.

*Operation of the embodiment of the invention shown in Figs. 1, 2 and 4*

Referring to Fig. 1 in the drawing, assume that the piston assemblage 4 is so disposed within the cylinder body 1 that the resilient sleeve element 29 associated therewith is disposed within the cavity 18 in the pressure head 2, as they are so shown in Fig. 1 of the drawing.

Assume now that it is desired that the piston assemblage 4 be moved in the direction of the pressure head 3. Under these circumstances the port 23 in the pressure head 3 will be vented to the atmosphere, for example, or to a return sump while the corresponding port 23 in the pressure head 2 will be availed of fluid under pressure such as compressed air. According to a feature of the invention, fluid under pressure will then flow through port 23 in the pressure head 2 into the respective cavity 18, thence into and through the flow passages 37 in the respective resilient sleeve element 29 and, by flexure of the valve portion 34 of said resilient sleeve element radially outward away from the seat 36, such fluid under pressure will flow past said seat into annular cavity 35 and into the pressure chamber 22 where such fluid pressure will act on the respective face of the piston assemblage 4 to cause same to move in the direction of pressure chamber 6, while such resilient sleeve element is withdrawn from the cavity 18 of the pressure head 2 and the other resilient sleeve element 29 in said pressure chamber 6 is advanced in the direction of the pressure head 3.

As the piston assemblage 4 nears the completion of its stroke in the direction of pressure head 3, the tapered end of the respective resilient sleeve element 29 will enter the open end of the cavity 18 in said pressure head and at its outer cylindrical surface will slidably engage the cylindrical surface 20 of said cavity to seal off direct communication between the pressure chamber 6 and the said cavity. As such resilient sleeve element continues to become inserted in the respective cavity 18 to a greater extent, the fluid trapped in the chamber 6 tends to become compressed between the piston assemblage and the pressure head 3 for cushioning final movement of the piston, in the well-known manner. During such cushioning of the piston assemblage 4, the pressure of fluid built up in the chamber 6 will act on the valve portion 34 of the respective resilient sleeve element 29 to urge same into tight sealing engagement with the annular seat 36 associated with the respective piston element 8, to prevent escape of fluid under pressure from the pressure chamber 6 to the cavity 18 in the pressure head 3 by way of the flow passages 37 in said resilient sleeve element. At the same time fluid under pressure is permitted to escape from the pressure chamber 6 at a controlled rate by way of the passage 26, needle valve chamber 27, radial passage 25, cavity 18 and the passage 23 in the pressure head 3. By adjustment of the needle valve 28, the rate of release of fluid under pressure from the chamber 6 during cushioning of the piston assemblage 4 may be controlled according to the degree of cushioning desired as determined by operating conditions of the cylinder device.

*Operation of the embodiment of the invention shown in Fig. 5*

In the alternate embodiment of the invention as shown in Fig. 5, where the outer diameter of the resilient sleeve element 29 is less than the inner diameter of the cylindrical surface 20 of the respective cavity 18, cushioning of the piston assemblage 4 is attained in substantially the same manner as that described in connection with the structure shown in Figs. 1 and 2, with the exception that in the Fig. 5 structure, the passages 25, 26 and the needle valve 28 may be dispensed with the restricted release of fluid under pressure from the respective pressure chamber to the atmosphere is attained by flow of fluid under pressure through the clearance passage 30 surrounding said resilient sleeve element.

Subsequently, return supply of fluid under pressure to the respective pressure chamber at one side of the piston assemblage via the respective port 23 and cavity 18 is attained by supply of fluid under pressure in the same manner as aforedescribed, namely via the passages 37 in the respective resilient sleeve element 29 by radial displacement of the valve portion 34 of said element, even though some slight flow of fluid under pressure from the cavity 18 to the respective chamber at one side of the piston assemblage will occur by way of the clearance passage 30. It should be pointed out that this clearance passage 30 is intended to restrict flow of fluid under pressure from the pressure chamber into the cavity 18 during cushioning of the piston assemblage and that for sake of clarity of illustration the size of such clearance passage as shown in the drawing has been exaggerated.

Having now described the invention, what I claim as new and desire to secure by Letters Patent is:

1. In a fluid pressure cylinder device, the combination of piston means for slidable sealing engagement with the wall of cylinder, and plug-and-valve means projecting centrally from said piston means and attached thereto for advancement therewith into a cavity in a pressure head to prevent facile escape of fluid from within said cylinder via said cavity during such advancement of the piston means into the cavity and to permit facile ingress of fluid under pressure via said cavity to said piston means for return movement thereof, said plug-and-valve means comprising a cylindrical peripheral portion of resilient material having formed therein a plurality of circumferentially-spaced-apart flow passages opening longitudinally therethrough to accommodate the aforesaid ingress of fluid under pressure to said piston means and an integral annular valve portion to prevent flow of fluid under pressure through said flow passages in the reverse direction.

2. In a fluid pressure cylinder device, the combination of piston means for slidable sealing engagement with the wall of a cylinder, and plug-and-valve means projecting centrally from said piston means and attached thereto for advancement therewith into a cavity in a pressure head to prevent facile escape of fluid from within said cylinder via said cavity during such advancement of the piston means and to permit facile ingress of fluid under pressure via said cavity to said piston means for return movement thereof, said plug-and-valve means comprising a rigid central portion through the medium of which the attachment to said piston means is attained and a removable resilient sleeve-like portion encircling said rigid central portion, said resilient sleeve-like portion having a plurality of circumferentially-spaced-apart flow passages opening longitudinally therethrough to accommodate the aforesaid ingress to said piston means and adapted at one end for sealing cooperation with said piston means to prevent flow of fluid under pressure through said flow passages in the reverse direction.

3. The combination as set forth in claim 2, further characterized in that said rigid central portion includes a portion of a piston rod which adapts said piston means for operative connection with means to be actuated.

4. In a fluid pressure cylinder device, the combination of a piston rod having an end section of reduced diameter; piston means removably mounted on the aforesaid end section of said piston rod; a rigid sleeve element removably mounted also on the aforesaid end section of said piston rod; a nut in screw-threaded attachment with the one end of said end section and in contact with said rigid sleeve element to retain same and thereby also said piston means on said end section; a resilient sleeve element encircling said rigid sleeve element for advancement by said piston means together with said rigid sleeve element and respective portion of said end section into a central cavity in a pressure head to prevent facile escape of fluid ahead of said piston during such advancement, said resilient sleeve element having a plurality of circumferentially-spaced-apart flow passages opening longitudinally therethrough to accommodate facile ingress of fluid under pressure via said cavity to said piston means for return movement thereof and having an annular skirt-like valve portion cooperable with said piston means to prevent flow of fluid under pressure in the reverse direction through said passages; and retaining means cooperable with the outermost end of said resilient sleeve-like element to retained same on said rigid sleeve element.

5. The combination as set forth in claim 4, wherein said retaining means is in the form of a removable lock ring disposed in a groove in the outer periphery of said rigid sleeve and in contact with the non-valved end of said resilient sleeve.

6. In a fluid pressure cylinder device, the combination with a hollow cylinder body and a pressure head having a cylindrical cavity opening centrally into the interior of said cylinder body, with a supply and release port opening into such cavity for ingress and egress of fluid under pressure to and from said device, and a restricted release communication opening from the interior of said device into said supply and release port in by-pass of the open end of said cavity for restricted release of fluid under pressure from said cylinder body; of piston means for slidable sealing engagement with the inner wall of said cylinder body, and plug-and-valve means projecting centrally from said piston means and attached thereto for insertion into said cavity to prevent escape of fluid under pressure from within said cylinder body via other than said restricted release communication during stroke-completing movement of said piston means in the direction of said pressure head, said plug-and-valve means comprising a cylindrical peripheral portion of resilient material for sliding sealed engagement with the cylindrical wall of said cavity during the aforesaid insertion, and said cylindrical peripheral portion having formed therein a plurality of circumferentially-spaced-apart flow passages opening longitudinally therethrough to accommodate the aforesaid ingress of fluid under pressure into said cylinder body for return movement of said piston means and having an integral annular valve portion to prevent flow of fluid under pressure through said flow passages in the reverse direction.

7. The combination as set forth in claim 6, further characterized in that the outer surface of the aforesaid cylindrical peripheral portion of said plug-and-valve means has a plurality of longitudinally-spaced-apart annular grooves for the storage of lubricant.

8. In a fluid pressure cylinder device, the combination of a piston rod having a reduced end section and an annular shoulder at the juncture of such end section with the remainder of said piston rod; piston means and a pair of rigid sleeve elements at opposite sides, respectively, of said piston means, all removably mounted on the aforesaid reduced end section of said piston rod; a nut in screw-threaded attachment with the projecting end of said reduced end section for clamping said piston means and rigid sleeve elements between such nut and the aforesaid annular shoulder; a pair of resilient sleeve elements encircling said rigid sleeve elements, respectively, for advancement by said piston means together with said rigid sleeve elements and encircled portions of said reduced end section into respective central cavities in pressure heads at opposite ends of said cylinder device to prevent facile escape of fluid ahead of said piston means during stroke completing movement thereof in each of opposite directions, each of said resilient sleeve elements having a plurality of circumferentially-spaced-apart flow passages opening longitudinally therethrough to accommodate facile ingress of fluid under pressure to said piston means for return movement thereof from a respective travel limit position and each of said resilient sleeve elements also having an annular skirt-like valve portion cooperable with said piston means to prevent flow of fluid under pressure in the reverse direction through the respective flow passages; and respective retaining means securing said resilient sleeve elements onto the respective rigid sleeve elements.

9. In a fluid pressure cylinder device, the combination of a piston rod having a reduced end section and an annular shoulder at the juncture of such end section with the remainder of said piston rod; piston means and a rigid sleeve element at one side thereof removably mounted on said reduced end section, said rigid sleeve element having an outside diameter substantially equal to that of the aforesaid remainder of the piston rod; a nut in screw-threaded attachment with the projecting end of said reduced end section and in contact with one end of said rigid sleeve element whereby said piston means is urged into contact with the aforesaid annular shoulder; a pair of like resilient sleeve elements, one mounted coaxially on the aforesaid remainder of the piston rod at one side of said piston means and the other mounted coaxially on said rigid sleeve element, each of said resilient sleeve elements being for advancement by said piston means together with respective components encircled thereby into a central cavity in a respective pressure head to prevent facile escape of fluid under pressure from said cylinder device ahead of said piston means during its stroke completing movement in a respective direction, and each of said resilient sleeve elements having a plurality of circumferentially-spaced-apart flow passages opening longitudinally therethrough to accommodate facile ingress of fluid under pressure to said piston means for return movement thereof from a respective travel limit position, and an integral annular skirt-like valve portion cooperable with said piston means to prevent flow of fluid under pressure in the reverse direction through the respective flow passages.

10. In a fluid pressure cushioned cylinder device, the combination of piston means and a plug-and-valve assemblage projecting in an axial direction centrally from said piston means for advancement therewith into a central cavity in a pressure head to prevent facile escape of fluid under pressure thereby during the final stroke completing stages of such advancement for piston cushioning purposes, said plug-and-valve assemblage including a cylindrical element of resilient material forming the outer periphery thereof for sliding sealed engagement with the wall of such cavity and having a plurality of circumferentially-spaced-apart flow passages opening longitudinally therethrough for the ingress of fluid under pressure to said piston means and an integral skirt-like valve portion cooperable with said piston means to prevent flow of fluid under pressure in the reverse direction through said flow passages, said piston means having an annular recess formed in one face thereof to accommodate projection of said valve portion coaxially thereinto and a frustrated conical surface at the innermost radial extremity of said annular recess as a seat for said valve portion.

11. In a piston assemblage of the type having a coaxial projection for entering a closely conforming bore in a cylinder head to provide for cushioning the movement of the piston near the end of its stroke, said piston assemblage comprising a piston having a conical valve seat formed on one face thereof concentrically with respect to the axis of said piston, a coaxial projection on the same side of said piston as said valve seat, a sleeve element of resilient material coaxially surrounding said projection and having an outer diameter closely conforming to the diameter of the bore in the cylinder head, said sleeve element also having longitudinal passages therethrough opening at opposite ends thereof and a flexible annular valve portion at least partly concentrically surrounding and seating on said conical valve seat, the pressure of fluid trapped between the piston and cylinder head during cushioned travel thereof serving to maintain said annular valve portion in seated sealing relation on said conical valve seat and the pressure of fluid supplied to said bore flowing via said longitudinal passages and between said valve and valve seat to exert pressure on said piston to move it away from the cylinder head having said bore.

References Cited in the file of this patent

UNITED STATES PATENTS

| | | |
|---|---|---|
| 2,704,996 | Peterson et al. | Mar. 29, 1955 |
| 2,710,595 | Peterson et al. | June 14, 1955 |
| 2,719,510 | Elder | Oct. 4, 1955 |